United States Patent
Bates et al.

(10) Patent No.: US 12,428,213 B2
(45) Date of Patent: Sep. 30, 2025

(54) SUBSTANCE DISPENSING SYSTEM AND METHOD OF MAKING

(71) Applicant: ADCO Products, LLC, Michigan Center, MI (US)

(72) Inventors: Justin Bates, Clarklake, MI (US); Yuwei Liu, Ann Arbor, MI (US); David W. Carnahan, Bremerton, WA (US)

(73) Assignee: ADCO PROUCTS, LLC, Michigan Center, MI (US)

( * ) Notice: Subject to any disclaimer, the term of this patent is extended or adjusted under 35 U.S.C. 154(b) by 0 days.

(21) Appl. No.: 18/647,197

(22) Filed: Apr. 26, 2024

(65) Prior Publication Data

US 2024/0270477 A1    Aug. 15, 2024

Related U.S. Application Data

(63) Continuation of application No. 18/047,881, filed on Oct. 19, 2022, now Pat. No. 11,999,556.

(60) Provisional application No. 63/262,700, filed on Oct. 19, 2021.

(51) Int. Cl.
| | | |
|---|---|---|
| *B65D 83/141* | (2025.01) | |
| *B65D 83/44* | (2006.01) | |
| *B65D 83/682* | (2025.01) | |

(52) U.S. Cl.
CPC ......... *B65D 83/141* (2025.01); *B65D 83/682* (2013.01); *B65D 83/44* (2013.01)

(58) Field of Classification Search
CPC ..... B65D 83/752; B65D 83/682; B65D 83/44
USPC ....................................................... 222/394
See application file for complete search history.

(56) References Cited

U.S. PATENT DOCUMENTS

| | | | | |
|---|---|---|---|---|
| 3,400,095 | A * | 9/1968 | Kremer | C09K 3/30 524/903 |
| 4,161,458 | A * | 7/1979 | Kolleth | C09K 3/30 424/44 |
| 4,380,505 | A * | 4/1983 | Wittenhorst | A61K 9/124 516/8 |
| 4,857,366 | A * | 8/1989 | Schumacher | C03C 27/048 427/407.1 |
| 6,013,691 | A * | 1/2000 | Braun | C08J 9/12 521/174 |
| 7,705,056 | B1 * | 4/2010 | Carnahan | C09J 11/00 521/910 |
| 8,637,595 | B2 * | 1/2014 | Wuerch | C09J 153/00 524/523 |
| 9,321,580 | B2 * | 4/2016 | Kuriyama | B32B 7/12 |
| 10,150,607 | B2 * | 12/2018 | Bates | B65D 81/325 |

(Continued)

FOREIGN PATENT DOCUMENTS

WO    WO-2023069974 A1 *  4/2023  .......... B65D 83/141

*Primary Examiner* — Paul R Durand
*Assistant Examiner* — Michael J. Melaragno
(74) *Attorney, Agent, or Firm* — Daniel J. Barta

(57) ABSTRACT

A substance dispensing system including a first pressure vessel defining a first interior space; a first substance positioned in the first interior space; a first portion of a first propellant positioned in the first interior space; and a first portion of a second propellant positioned in the first interior space. At least 90 percent by weight of the first propellant is at least one of carbon dioxide, nitrous oxide, and combinations thereof. At least 90 percent by weight of the second propellant is at least one of nitrogen, argon, helium, oxygen, and combinations thereof.

20 Claims, 2 Drawing Sheets

(56) References Cited

U.S. PATENT DOCUMENTS

| | | | |
|---|---|---|---|
| 2002/0161056 A1* | 10/2002 | Carnahan | C09J 11/00 |
| | | | 516/1 |
| 2003/0165628 A1* | 9/2003 | Simmons | B05B 9/005 |
| | | | 222/394 |
| 2008/0006363 A1* | 1/2008 | Townsend | C09J 175/04 |
| | | | 156/331.7 |
| 2013/0012609 A1* | 1/2013 | Assemat | C08G 18/10 |
| | | | 521/110 |
| 2018/0044098 A1* | 2/2018 | Nakajima | C09K 5/16 |
| 2023/0150752 A1* | 5/2023 | Carnahan | C08G 18/3206 |
| | | | 222/394 |

* cited by examiner

SUBSTANCE DISPENSING SYSTEM AND METHOD OF MAKING

CROSS REFERENCE TO RELATED APPLICATIONS

This application is a Continuation of U.S. application Ser. No. 18/047,881 filed Oct. 19, 2022, which claims the benefit of U.S. Provisional Application No. 63/262,700, filed Oct. 19, 2021, which is incorporated herein.

FIELD

The present disclosure relates to a system for dispensing a substance. More particularly, the present disclosure relates to a system for dispensing a liquid substance without the use of a mechanical pump.

BACKGROUND

Various compositions may be applied to a substrate via spraying. One technique to spray a composition is to contain the composition in a container and use a secondary means to propel the composition from the container. An example secondary means is compressed air provided with a mechanical pump.

A mechanical pump may have certain limitations. For example, the pump may have power requirements such as an electrical motor or gasoline engine to power the pump. Such a pump may need an electrical outlet, a battery, or a liquid fuel supply. These may provide certain limitations in certain environments. For example, if a spark-proof device is needed, an electrical motor may be not a good option. If the pump requires a large engine to power it, the pump may have limited portability.

Another technique for spraying uses a pressurized gas in a container as a propellant. The propellant and the composition can be enclosed in a container and the propellant is used to propel the composition from the container as an aerosol which is then deposited on a substrate.

Compressed gases can be used as propellants in aerosol delivery systems. Organic compounds have been used as propellants for the delivery of liquid substances. Some propellants include, for example, chlorofluorocarbons (CFCs), hydrochlorofluorocarbons (HCFC), hydrofluorocarbons (HFCs), hydrofluoroolefins (HFOs), and hydrocarbons (e.g. dimethyl ether).

Pressurized products that use flammable propellants can pose hazards, for example, in environments having open flames or near flammable materials. Also, certain pressurized gases used as propellants will increase the amount of volatile organic components released, which might limit where such products can be used.

Generally, propellants that have a high global warming or ozone depletion potential are not environmentally friendly and may face additional regulation in the future. CFCs, HFCs and HCFCs may have a high global warming potential, may be an expensive option, may only be available from a limited number of suppliers, and material availability may be a concern in the future.

There is a need for a device that can spray a substance and that can operate without the use of a pump. There is a need for a device that can spray a substance and that is portable. There is a need for a device that can dispense a substance without the need for flammable propellants or environmentally damaging propellants.

SUMMARY

Disclosed herein is a substance dispensing system. The system includes a first pressure vessel defining a first interior space; a first substance positioned in the first interior space; a first portion of a first propellant positioned in the first interior space; a first portion of a second propellant positioned in the first interior space. A combination of the partial pressure of the first propellant and the partial pressure of the second propellant define a pressure within the first interior space. At least 90 percent by weight the first propellant is at least one of carbon dioxide, nitrous oxide, and combinations thereof. At least 90 percent by weight the second propellant is at least one of nitrogen, argon, helium, oxygen, and combinations thereof. In some aspects, the dispensing system includes a first regulator configured to be operable between a closed position and an open position and control fluid communication between the first interior space and an outside of the pressure vessel.

In some aspects, the first propellant is at least one gas from the group consisting essentially of carbon dioxide, nitrous oxide, and combinations thereof; and wherein the second propellant is at least one gas from the group consisting essentially of nitrogen, argon, oxygen, helium, and combinations thereof. In some aspects, the first propellant and the second propellant are free of hydrocarbons, hydrofluorocarbons, and chlorofluorocarbons. The dispensing system is configured to effect transport of the first substance from the first interior space, free of a pump.

The substance dispensing system is configured such that a combination of the partial pressure of the first propellant and the partial pressure of the second propellant in the first interior space directly exerts a pressure on the first substance to effect transport thereof from the first interior space. In some aspects, the pressure within the first interior space is from greater than atmospheric pressure to 320 psi.

In some aspects, the system further includes a second pressure vessel defining a second interior space; a second substance positioned in the second interior space; a second portion of the first propellant positioned in the second interior space; a second portion of the second propellant positioned in the second interior space. A combination of the partial pressure of the first propellant and the partial pressure of the second propellant define a pressure within the second interior space. In some aspects, the system includes a second regulator configured to be operable between a closed position and an open position and control fluid communication between the second interior space and an outside of the second pressure vessel.

In some aspects, a weight ratio of the second propellant to the first propellant in the first interior space is from greater than zero to 40:100. In some aspects, a weight ratio of the second propellant to the first propellant in the first interior space is from 5:100 to 25:100. In some aspects, a weight ratio of the second propellant to the first propellant in the first interior space is from 10:100 to 15:100. In some aspects, a weight ratio of the first propellant to the first substance in the first interior space is from 2:100 to 4:100. In some aspects, a weight ratio of the second propellant to the first substance in the first interior space is from greater than zero to 1:100. In some aspects, a weight ratio of the second propellant to the first propellant in the second interior space is from greater than zero to 30:100. The substance dispensing system of claim 7, wherein a weight ratio of the second propellant to the first propellant in the second interior space is from 4:100 to 20:100. In some aspects, a weight ratio of the second propellant to the first propellant in the second interior space is from 6:100 to 15:100. In some aspects, a weight ratio of the first propellant to the second substance in the second interior space is from 4:100 to 8:100. In some aspects, a weight ratio of the first propellant to the second substance in the second interior space is from 5:100 to 7:100. In some aspects, a weight ratio of the first propellant to the second substance in the second interior space is from 5:100 to 6:100. In some aspects, a weight ratio of the second propellant to the second substance in the second interior space is from greater than zero to 1.5:100. In some aspects, a weight ratio of first propellant in the first interior space to the first propellant in the second interior space is from 40:100 to 90:100. In some aspects, a weight ratio of second propellant in the first interior space to the second propellant in the second interior space is from 80:100 to 150:100. In some aspects, a ratio of the pressure in the first interior space to the pressure in the second interior space is from 70:100 to 130:100.

In some aspects, the first substance includes an isocyanate compound. In some aspects, the second substance includes an isocyanate reactive compound, a metal catalyst, a surfactant, a chain extender, and a blowing agent. In some aspects, the dispensing system is configured to effect transport of the second substance from the second interior space, free of a pump. In some aspects, the substance dispensing system is configured such that a combination of the partial pressure of the first propellant and the partial pressure of the second propellant in the second interior space directly exerts a pressure on the second substance to effect transport thereof from the second interior space.

In some aspects, the system further comprises a spray apparatus in fluid communication with the first regulator and the second regulator. In some aspects, the system further comprises a spray apparatus in fluid communication with the first regulator and the second regulator, the spray apparatus configured to combine the first substance and the second substance to form an adhesive composition. In some aspects, the system further comprises a spray apparatus in fluid communication with the first regulator and the second regulator, the spray apparatus configured to combine the first substance and the second substance to form an adhesive composition and deliver the adhesive composition to a substrate. In some aspects, the substance dispensing system is configured to dispense the adhesive composition in a spray pattern being at least one of single stream, aerosol, web-shaped, mist pattern, lace pattern, pebble pattern, fan-shaped, ribbon, and spatter.

Disclosed herein is a substance dispensing system. The system includes a first pressure vessel defining a first interior space; a first substance positioned in the first interior space; a first portion of a first propellant positioned in the first interior space; a first portion of a second propellant positioned in the first interior space. In some aspects, the dispensing system includes a first regulator configured to be operable between a closed position and an open position and control fluid communication between the first interior space and an outside of the first pressure vessel. A combination of the partial pressure of the first propellant and the partial pressure of the second propellant define a pressure within the first interior space. The system includes a second pressure vessel defining a second interior space; a second substance positioned in the second interior space; a second portion of the first propellant positioned in the second interior space; a second portion of the second propellant in the second interior space and substantially in the gas phase of the second interior space. In some aspects, the system includes a second regulator configured to be operable between a closed position and an open position and control fluid communication between the second interior space and an outside of the second pressure vessel. A combination of the partial pressure of the first propellant and the partial pressure of the second propellant define a pressure within the second interior space. At least 90 percent by weight the first propellant is at least one of carbon dioxide, nitrous oxide, and combinations thereof. At least 90 percent by weight the second propellant is at least one of nitrogen, argon, helium, air, and combinations thereof. In some aspects, the substance dispensing system is configured to effect transport of the first substance from the first interior space and the second substance from the second interior space, free of a pump.

In some aspects, the first propellant and the second propellant are free of hydrocarbons, hydrofluorocarbons, and chlorofluorocarbons. In some aspects, the first propellant is at least one gas from the group consisting essentially of carbon dioxide, nitrous oxide, and combinations thereof; and wherein the second propellant is at one least gas from the group consisting essentially of nitrogen, argon, oxygen, helium, and combinations thereof. In some aspects, a weight ratio of the second propellant to the first propellant in the first interior space is from greater than zero to 40:100. In some aspects, a weight ratio of the second propellant to the first propellant in the first interior space is from 5:100 to 25:100. In some aspects, a weight ratio of the second propellant to the first propellant in the first interior space is from 10:100 to 15:100. In some aspects, a weight ratio of the first propellant to the first substance in the first interior space is from 2:100 to 4:100. In some aspects, a weight ratio of the second propellant to the first substance in the first interior space is from greater than zero to 1:100. In some aspects, a weight ratio of the second propellant to the first propellant in the second interior space is from greater than zero to 30:100. In some aspects, a weight ratio of the second propellant to the first propellant in the second interior space is from 4:100 to 20:100. In some aspects, a weight ratio of the second propellant to the first propellant in the second interior space is from 6:100 to 15:100. In some aspects, a weight ratio of the first propellant to the second substance in the second interior space is from 4:100 to 8:100. In some aspects, a weight ratio of the first propellant to the second substance in the second interior space is from 5:100 to 7:100. In some aspects, a weight ratio of the first propellant to the second substance in the second interior space is from 5:100 to 6:100. In some aspects, a weight ratio of the second propellant to the second substance in the second interior space is from greater than zero to 1.5:100. In some aspects, a weight ratio of first propellant in the first interior space to the first propellant in the second interior space is from 40:100 to 90:100. In some aspects, a weight ratio of second propellant in the first interior space to the second propellant in the second interior space is from 80:100 to 150:100.

In some aspects, a pressure within the first interior space is from atmospheric pressure to 320 psi. In some aspects, the first substance includes an isocyanate compound. In some aspects, the second substance includes an isocyanate reactive compound, a metal catalyst, a surfactant, a chain extender, and a blowing agent. In some aspects the system further comprises a spray apparatus in fluid communication with the first regulator and the second regulator. In some aspects the system further comprises a spray apparatus in fluid communication with the first regulator and the second regulator, the spray apparatus configured to combine the first substance and the second substance to form an adhesive composition. In some aspects the system further comprises a spray apparatus in fluid communication with the first regulator and the second regulator, the spray apparatus configured to combine the first substance and the second substance to form an adhesive composition and deliver the adhesive composition to a substrate. In some aspects, the substance dispensing system is configured to dispense the adhesive composition in a spray pattern being at least one of single stream, aerosol, web-shaped, mist pattern, lace pattern, pebble pattern, fan-shaped, ribbon, and spatter.

Disclosed herein is a substance dispensing system. The system includes a first pressure vessel defining a first interior space; a first substance positioned in the first interior space; a first propellant positioned in the first interior space; a second propellant positioned in the first interior space; and a first regulator configured to be operable between a closed position and an open position and control fluid communication between the first interior space and an outside of the second pressure vessel. The substance dispensing system is configured such that a combination of the partial pressure of the first propellant and the partial pressure of the second propellant directly exerts a pressure on the first substance to effect transport thereof from the first interior space. The first propellant and the second propellant are free of hydrocarbons, hydrofluorocarbons, and chlorofluorocarbons.

In some aspects, the substance dispensing system further comprises a second pressure vessel defining a second interior space; a second substance positioned in the second interior space; a second portion of the first propellant; a second portion of the second propellant; and a second regulator configured to be operable between a closed position and an open position and control fluid communication between the second interior space and an outside of the second pressure vessel. The substance dispensing system is configured such that a combination of the partial pressure of the first propellant and the partial pressure of the second propellant directly exerts a pressure on the second substance to effect transport thereof from the second interior space.

In some aspects, the first propellant comprises at least 90 percent by weight a gas from the group of carbon dioxide, nitrous oxide, and combinations thereof; and wherein the second propellant comprises at least 90 percent by weight a gas from the group of nitrogen, argon, helium, oxygen, and combinations thereof. In some aspects, the first propellant is at least one gas from the group consisting essentially of carbon dioxide, nitrous oxide, and combinations thereof; and wherein the second propellant is at one least gas from the group consisting essentially of nitrogen, argon, oxygen, helium, and combinations thereof. In some aspects, the dispensing system is configured to effect transport of the first substance from the first interior space, free of a pump.

In some aspects, a weight ratio of the second propellant to the first propellant in the first interior space is from greater than zero to 40:100. In some aspects, a weight ratio of the second propellant to the first propellant in the first interior space is from 5:100 to 25:100. In some aspects, a weight ratio of the second propellant to the first propellant in the first interior space is from one: 10 to 15:100. In some aspects, a weight ratio of the first propellant to the first substance in the first interior space is from 2:100 to 4:100. In some aspects, a weight ratio of the second propellant to the first substance in the first interior space is from greater than zero to one:100. In some aspects, a weight ratio of the second propellant to the first propellant in the second interior space is from greater than zero to 30:100. In some aspects, a weight ratio of the first propellant to the second substance in the second interior space is from 4:100 to 8:100, preferably from 5:100 to 7:100, and more preferably from 5:100 to 6:100. In some aspects, a weight ratio of the second propellant to the second substance in the second interior space is from greater than zero to 1.5:100. In some aspects, a weight ratio of first propellant in the first interior space to the first propellant in the second interior space is from 40:100 to 90:100. In some aspects, a weight ratio of second propellant in the first interior space to the second propellant in the second interior space is from 80:100 to 150:100. In some aspects, a ratio of the pressure in the first interior space to the pressure in the second interior space is from 70:100 to 130:100. In some aspects, a pressure within the first interior space is from atmospheric pressure to 320 psi.

In some aspects, the first substance includes an isocyanate compound. In some aspects, the second substance includes an isocyanate reactive compound, a metal catalyst, a surfactant, a chain extender, and a blowing agent. In some aspects the system further comprises a spray apparatus in fluid communication with the first regulator and the second regulator. In some aspects the system further comprises a spray apparatus in fluid communication with the first regulator and the second regulator, the spray apparatus configured to combine the first substance and the second substance to form an adhesive composition. In some aspects the system further comprises a spray apparatus in fluid communication with the first regulator and the second regulator, the spray apparatus configured to combine the first substance and the second substance to form an adhesive composition and deliver the adhesive composition to a substrate. In some aspects, the substance dispensing system is configured to dispense the adhesive composition in a spray pattern being at least one of single stream, aerosol, web-shaped, mist pattern, lace pattern, pebble pattern, fan-shaped, ribbon, and spatter.

These embodiments are intended to be within the scope of the invention disclosed herein. These and other embodiments of the present invention will become readily apparent to those skilled in the art from the following detailed description of the various embodiments having reference to the attached figures, the invention not being limited to any particularly preferred embodiment(s) disclosed. Other features and advantages will be apparent from the following brief description of the drawings (where like reference numbers and designations in the various drawings indicate like elements), the description of the preferred embodiments, and from the claims.

GLOSSARY

Figure 1:
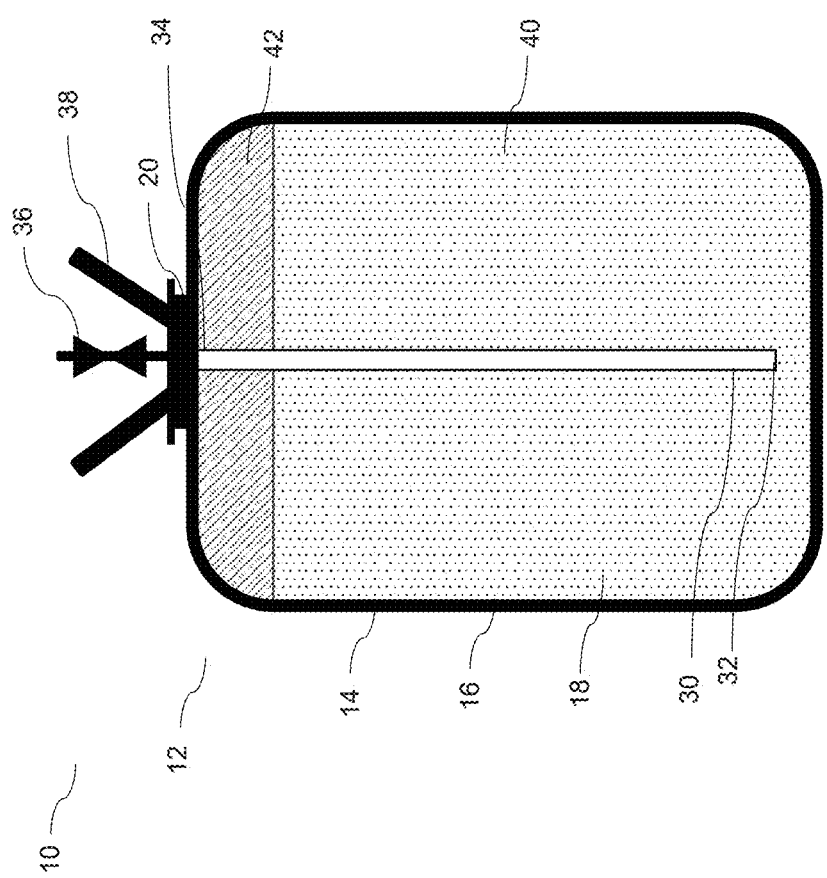
FIG. 1 shows a substance dispensing system, in accordance with certain embodiments.

As used herein, an aerosol is a suspension of fine particles or droplets in air or another gas.

As used herein, "portable" is defined as movable from a first location to a second location using the work of a single person without the use of heavy mechanical equipment.

As used herein, "work" is defined as the process of energy transfer to the motion of an object through the application of force.

As used herein, a pump is defined as a device that moves a fluid substance from a first location to a second location by mechanical action.

As used herein, a propellant is defined as a chemical with a vapor pressure of greater than 16.5 kPa at 20° C.

As used herein, a hydrofluorocarbon (HFC) is a compound made up of only hydrogen, fluorine, and carbon atoms.

As used herein, a hydrofluoroolefin is a compound made up of only hydrogen, fluorine, and carbon atoms, and which is unsaturated (i.e. it is one kind of HFC that contains double bonds).

As used herein, chlorofluorocarbons (CFC) and hydrochlorofluorocarbons (HCFC) are compounds made up of only hydrogen, fluorine, chlorine, and carbon atoms.

As used herein, "pressurized" is defined as having a pressure greater than a reference pressure.

As used herein, "pressurize" is the act of producing or maintaining a pressure greater than a reference pressure.

As used herein, the term "soluble," when used in the context of a gas in contact with a liquid substance, is defined as 50% or greater of the total amount of that gas present with the liquid substance is dissolvable in the substance at a given pressure at equilibrium.

As used herein, the term "insoluble," when used in the context of a gas in contact with a liquid substance, at equilibrium, is defined as less than 50% of the total amount of that gas present with the liquid substance is dissolvable in the substance at a given pressure at equilibrium.

As used herein, a "renewable" material is defined as a material produced by a natural process at a rate comparable to its rate of consumption, such as can be replenished by naturally grown organisms (e.g., harvested from a forest or other wild-grown plant) or by engineered agricultural techniques.

As used herein, "bio-based" is defined as a material that is produced or is derived from at least 25% by weight of a renewable material As used herein, "recycled" is defined as a material that has been used in an end product at least once before in its current chemical configuration.

DETAILED DESCRIPTION

Disclosed herein is a substance dispensing system that is free of a pump. The substance dispensing system can spray a substance onto a substrate. The substance dispensing system includes at least one pressure vessel within which is contained a deliverable substance, a first propellant that is soluble in the substance, and a second propellant that is substantially insoluble in the substance. The second propellant remains in the gas phase at pressures below 400 psi (2,758 kPa) and room temperature.

The substance dispensing system can dispense a substance using a pressurized vessel free of hydrocarbons, hydrofluorocarbons (HFCs), hydrofluoroolefins (HFOs), chlorofluorocarbons (CFCs), and hydrochlorofluorocarbons (HCFCs). The substance dispensing system is portable. The substance can be dispensed as a spray. The substance dispensing system can spray an adhesive composition onto a substrate.

Pressure Vessel

A substance dispensing system 10 is shown in FIG. 1. As shown in FIG. 1, the substance dispensing system 10 includes a dispensing device 12. The dispensing device 12 includes a pressure vessel 14 having a wall 16 that defines an interior space 18. The pressure vessel 14 has an opening 20 defined through the wall 16 such that a substance 40 can pass though. The dispensing device 12 can include additional features such as a flow tube 30, a valve 36, and a handle 38. The substance dispensing system 10 can contain a substance 40 and define a headspace 42 within the interior space 18 of the pressure vessel 16.

The interior space 18 has a defined volume. The wall 16 of the pressure vessel maintains the interior space 18 at a fixed volume as the interior space 18 is pressurized. The pressure vessel 14 can be pressurized to a pressure within the interior space 18 that is greater than a reference pressure. Generally, a reference pressure would be the pressure of the environment outside of the pressure vessel 14. If the pressure inside the pressure vessel 14 is greater than the pressure of the environment outside of the pressure vessel 14, the interior volume 16 of the pressure vessel 14 is pressurized. As used herein, unless stated otherwise, the reference pressure is atmospheric pressure at sea level. As used herein, unless stated otherwise, the temperature is room temperature (from 20° C. to 23° C.).

The substance dispensing system 10 can include any suitable container that can withstand pressurization, such as any suitable canister available to one of skill in the art, for example a spray can. The substance dispensing system 10 can be configured such that is portable. For example, the pressure vessel 14 can include any container that is sized such that it can be carried and handled by the work of one person.

The opening 20 allows fluid communication between the interior space 18 of the pressure vessel 14 and the space outside of the pressure vessel 14. The flow tube 30 can be positioned inside the pressure vessel 14. The flow tube 30 can have a wall defining a lumen. The flow tube 30 can have a first end 32 and a second end 34. The first end 32 can be positioned within the interior space 18 and the second end 34 can be attached to the opening 20 of the pressure vessel 14.

The valve 36 can define an inner flow channel and a gate that can be opened and closed to control flow through the flow channel. For example, the valve 36 can include a regulator configured to be operable between a closed position and an open position and control fluid communication between the interior space 18 and the outside of the pressure vessel 14. The valve 36 can be attached to the opening 20 of the pressure vessel 14 such that the valve 36 can be used to regulate flow through the opening 20. The regulator can allow flow of a fluid through the valve 36 but does not create or power flow of the fluid.

The substance 40 can be a liquid. The volume of the headspace 42 can be defined by the difference between interior space 18 and the volume of the interior space 18 occupied by the substance 40. The headspace 42 can be occupied by a gas.

Liquid Phase

The pressure vessel 14 can contain one or more components in a liquid phase. For example, the substance 40 can be contained within the pressure vessel 14 in the liquid phase. The substance 40 can include multiple components that are combined to form a composition.

The composition of the substance 40 can include one or more components that are a liquid when contained within the pressure vessel 14. For example, the composition of the substance 40 can include one or more components that are liquid only when contained at a suitable pressure.

The substance 40 can have a first composition when the substance 40 is outside the pressure vessel 14. The substance 40 can have a second composition when the substance 40 is inside the pressure vessel 14.

The substance 40 can include one or more components that are added to the composition after the substance 40 is put in the pressure vessel 14. The substance 40 can have a composition that changes, even while the substance 40 is inside the pressure vessel 14. For example, if one or more components of the substance 40 is removed from the composition, or if the amount of a component in the substance 40 increases, the composition of the substance 40 can change. For example, the substance 40 can have a first composition before being put inside the pressure vessel 14. The pressure vessel 14 can contain a component that dissolves in the substance 40 when the substance 40 is in the pressure vessel 14, forming a second composition. The substance 40 can contain a component that is present in the substance 40 in an amount that is dependent on the pressure inside the pressure vessel 14.

The substance 40 is deliverable from the pressure vessel 14 free from the use of a pump. For example, the substance 40 can be dispensed from the interior space 18 through the opening 20 in the pressure vessel 14 without the use of a mechanically driven pump. As substance 40 is dispensed from the pressure vessel 14, a propellant dissolved in the substance 40 boils from the substance 40 and enters the gas phase and can occupy the headspace 42 of the pressure vessel 14. Typically, a greater amount of propellent dissolved in the substance 40 at the start of dispensing will lead to the pressure inside the pressure vessel 14 falling at a lower rate when compared to a lesser amount of dissolved propellent in the substance at the start of dispensing.

Gas Phase

The pressure vessel 14 contains one or more components in a gas phase. In some embodiments, the components in the gas phase (e.g., the gases) in the pressure vessel 14 can be generally positioned in the headspace 42.

The pressure vessel 14 can contain one or more components that are a gas at atmospheric pressure, but that can be liquid when pressurized. The pressure vessel 14 can contain one or more propellants that are soluble in the substance 40. For example, the pressure vessel 14 can contain one or more propellants, with a first portion of the one or more propellants in a liquid phase (e.g. dissolved in the substance 40) and a second portion of the one or more propellants in a gas phase, for example, positioned in the first headspace 42.

The gas in the pressure vessel 14 can exert a pressure on the substance 40. In examples having more than one component in the gas phase (e.g. one or more gases) the combination of the partial pressures of the one or more gases defines a pressure within the first interior space. If the opening 20 is unrestricted, the pressure formed by the gas can push the substance 40 from the interior space 18 to the space outside the pressure vessel 14. For example, if the valve 36 is open the pressure in the pressure vessel 14 can effect transport of the substance 40 from the interior space 18.

In examples having one or more gases the combination of the partial pressures of the one or more gases directly exerts a pressure on the substance 40 to effect transport of the substance 40 from the interior space 18. The gas or gases act as a propellant and effect transport of the substance 40 from the interior space 18. The dispensing system 10 can thus drive the substance 40 from the first interior space 18, free of a pump.

A gas that effects transport of the substance from the pressure vessel 14 is useful as a propellant. In examples having one or more gases, each of the gases can contribute to effect transport of the substance 40, such that each of the one or more gases is a propellant. For example, each gas can act as a propellant alone. Alternatively, or additionally, the combination of one or more gases can act as a propellant.

Compressed gases suitable as propellants generally fall into one of two categories. The first category includes gases that is can be liquified when pressurized at a temperature of about 20° C., such as carbon dioxide and nitrous oxide, and are generally soluble in water and organic solvents. The second category includes gases, such as nitrogen, compressed air (typically about 71% nitrogen and 29% oxygen), and certain noble gases (e.g. argon, and helium), that cannot be liquified at temperatures above 20° C. These typically have limited solubility in water or organic solvents.

First Propellant

The substance dispensing system 10 includes a first propellant. The first propellant can be in a liquid phase at pressurized conditions. For example, the first propellant can be one that can be liquified when pressurized at a temperature of about 20° C. The first propellant can be soluble in a liquid substance. In some embodiments, the first propellant can be a gas that is soluble enough in the substance to reduce the viscosity of the substance as compared to a propellant that has limited solubility in the substrate.

The first propellant helps maintain the interior space 18 at a suitable pressure as the amount of substance 40 in the pressure vessel 14 falls. For example, the first propellant can boil out of the substance 40 as the pressure exerted on the surface of the substance 40 falls and the first propellant can enter the gaseous phase. The first propellant can serve as a liquid propellant when the substance 40 is under a suitable pressure and can boil out of the substance 40 when the pressure in the interior space 18 drops below the vapor pressure of the first propellant.

The solubility of the first propellant in the substance 40 can be chosen to provide suitable dispensing characteristics. For example, a suitable first propellant may be one that imparts a foaming action to the substance 40 as the substance 40 is dispensed. In some examples, a suitable first propellant may be one that propels the substance 40 in a particular spray pattern, such as a single stream, aerosol, web-shaped, mist pattern, lace pattern, pebble pattern, fan-shaped, ribbon, or spatter.

Suitable first propellants include chemicals that can be dissolved into the substance 40 but that do not react with the substance 40 such that the substance 40 undergoes an irreversible chemical reaction. In some embodiments, suitable first propellants can help maintain a pressure in the pressure vessel 14 and help to maintain a suitable volumetric flow rate that the substance 40 is dispensed at. In some embodiments, suitable first propellants can help maintain a suitable volumetric flow rate that the substance 40 is dispensed at while inhibiting the formation of bubbles in the stream of substance 40 as it is being dispensed.

A suitable first propellant is carbon dioxide ($CO_2$). Other gases that can also be used as a propellant include those that have similar desirable properties as $CO_2$. Carbon dioxide has been found to be soluble in various substances that are suitable for dispensing from a pressurized container. For example, $CO_2$ has been found to be soluble in certain adhesive compositions, such as one or both components in two-part polyurethane adhesives. Carbon dioxide can function as a liquid propellant when in a pressurized container. Carbon dioxide can boil from the substance in the pressurized container and enter the gas phase when the pressure in the container drops, such as after a portion of the substance has been dispensed from the container. In some embodiments, a suitable amount of $CO_2$ in the pressurized container helps maintain the volumetric flow rate of the substance being dispensed.

In some embodiments, $CO_2$ serves as viscosity modifier. For example, when dissolved in some substances, $CO_2$ can reduce the viscosity of the substance. In some instances, a lower viscosity can help optimize the dispense rate of the substance. For example, $CO_2$ may have a certain solubility, depending on the composition of the substance. In some embodiments, the amount of $CO_2$ added to each of two or more substances can be used to control the individual viscosities of the two or more substances such that a volumetric flow rate of each of the substances from individual dispensing systems can be within a suitable range of one another.

In some embodiments, evaporation of $CO_2$ from the substance is an endothermic reaction, and in some instance can inhibit certain chemical reactions. In some embodiments, $CO_2$ can help minimize bubbling of the substance as it is being dispensed. For example, the $CO_2$ solubility will determine the amount of gas available for blowing a liquid polymer composition that the $CO_2$ is dissolved in in turn defining a final density of a foam formed from the liquid polymer composition.

In some embodiments, the first propellant is at least one gas from the group consisting of carbon dioxide and nitrous oxide. In some embodiments, at least 90 percent by weight the first propellant is at least one of carbon dioxide and nitrous oxide.

In some embodiments, the first propellant includes, from greater than zero percent, from one, two, three or four, to six, seven, eight, nine, or 10 percent by weight at least one from the group of hydrocarbons (e.g. ethane; propane; butane; 1,1-difluorethylene), hydrofluorocarbons (HFC) (e.g. trifluoromethane, hydrofluoroolefins (HFO)), chlorofluorocarbons (CFC), hydrochlorofluorocarbons (HCFC), and combinations thereof, or a weight percent between any pair of the foregoing values, based on the entire weight of the first propellant.

Second Propellant

The substance dispensing system 10 includes a second propellant. The second propellant helps to supplement the pressure in the pressure vessel 14 in addition to the first propellant. The second propellant can help compensate for changes in the pressure of the pressure vessel 14 as the substance 40 is dispensed and can help maintain the pressure in the pressure vessel 14 at a suitable level. For example, if a high volumetric flow rate for dispensing the substance 40 is used, the second propellant can compensate for any delay in the first propellant boiling from the substance 40 and entering the gas phase.

The second propellant is substantially in the gas phase in the pressure vessel 14. The second propellant includes a gas that is difficult to liquefy at temperatures above 20° C. In some embodiments, the second propellant can be a gas that is substantially insoluble in the substance 40. In some embodiments, a suitable second propellant is a gas that can propel the substance 40 from the pressure vessel, but if present without the first propellant dissolved in the substance 40, the pressure in the pressure vessel 14 would decrease at a faster rate than if the second propellant is present.

Gases suitable as a second propellant include nitrous oxide, nitrogen, air (typically about 71% nitrogen and 29% oxygen), the noble gases (such as argon and helium), and combinations of these gases. In some embodiments, the second propellant consists of at least one gas from the group of nitrogen, air (typically about 71% nitrogen and 29% oxygen), the noble gases (e.g. argon and helium), and combinations of these gases. In some embodiments, at least 90 percent by weight the second propellant is at least one gas from the group of nitrogen, air, the noble gases (e.g. argon and helium), and combinations of these gases.

In some embodiments, a suitable amount of second propellant in the pressure vessel 14 in relation to the amount of one or both the first propellant and the substance 40 can provide a suitable pressure in the pressure vessel 14 to dispense the substance at a suitable volumetric flow rate and velocity.

In some embodiments, suitable amounts of each of the first and second propellant in the substance dispensing system 10 are selected as a ratio of the propellants to one another. For example, in one process for filling the pressure vessel 14, a suitable amount of first propellant can be added such that a portion of the first propellant dissolves into the substance 40. After the portion of the first propellant dissolves into the substance 40, the pressure in the pressure vessel 14 will decrease. Once the first propellant has been added and the pressure in the pressure vessel 14 falls to a suitable level, the second propellant can be added to the pressure vessel 14 until a suitable pressure has been attained. During dispensing, the first propellant can boil from the substance 40 in the pressure vessel 14 and enter the gas phase when the pressure in the pressure vessel 14 drops, such as after a portion of the substrate 14 has been dispensed from the pressure vessel 14. In some embodiments, a suitable total amount of first propellant in the pressure vessel 14 helps maintain the volumetric flow rate of the substance 40 being dispensed.

Substance

The systems and methods of the instant disclosure can be used to dispense various liquid substances. The substance 40 may be any suitable composition that can be contained within the pressure vessel 14 and then dispensed from the pressure vessel 14 and be deposited onto a substrate. The substance 40 may be one part of a multi-component system. The substance 40 can be one part of a multi-component system and can be combined with a second substance after being dispensed, to form the final composition of the multi-component system.

By way of a non-limiting example, the substance 40 can be an industrial substance such as a paint, primer, adhesive, sealant, coating (e.g. an anti-rust coating), dye, pigment, resin, insulation, air barrier, or lubricant. The substance 40 can include a polymer for industrial products for example, polyvinyl alcohol, polyvinyl acetate, polyvinyl chloride, ethylene acrylic acid, polyvinylpyrrolidone, ethylene acetic acid, polyethylene, polypropylene, polyether, polyester, polyamide, polyimide, polystyrene random and block copolymers (e.g. polystyrene, polystyrene isoprene, polystyrene maleic acid, polystyrene butadiene), polyisoprene, polyurethane, silicone, phenol formaldehyde, melamine formaldehyde, urea formaldehyde, acetone formaldehyde, rubber, gum, proteins, dextrin, starch, or cellulose. By way of a non-limiting example, the substance could be a consumer composition such as insect repellant, sunscreen, or deodorant.

An example composition that is suitable for dispensing with the systems and methods disclosed herein is an adhesive composition. By way of example, the systems and methods disclosed herein can be used to dispense one or more components of a polyurethane adhesive composition. For example, the substance dispensing can be used to dispense a two-part polyurethane adhesive composition. The polyurethane adhesive composition can include a first substance that includes an isocyanate compound and a second part that includes an isocyanate reactive compound. Each of the first part and the second part can be contained in a pressure vessel.

Figure 2:
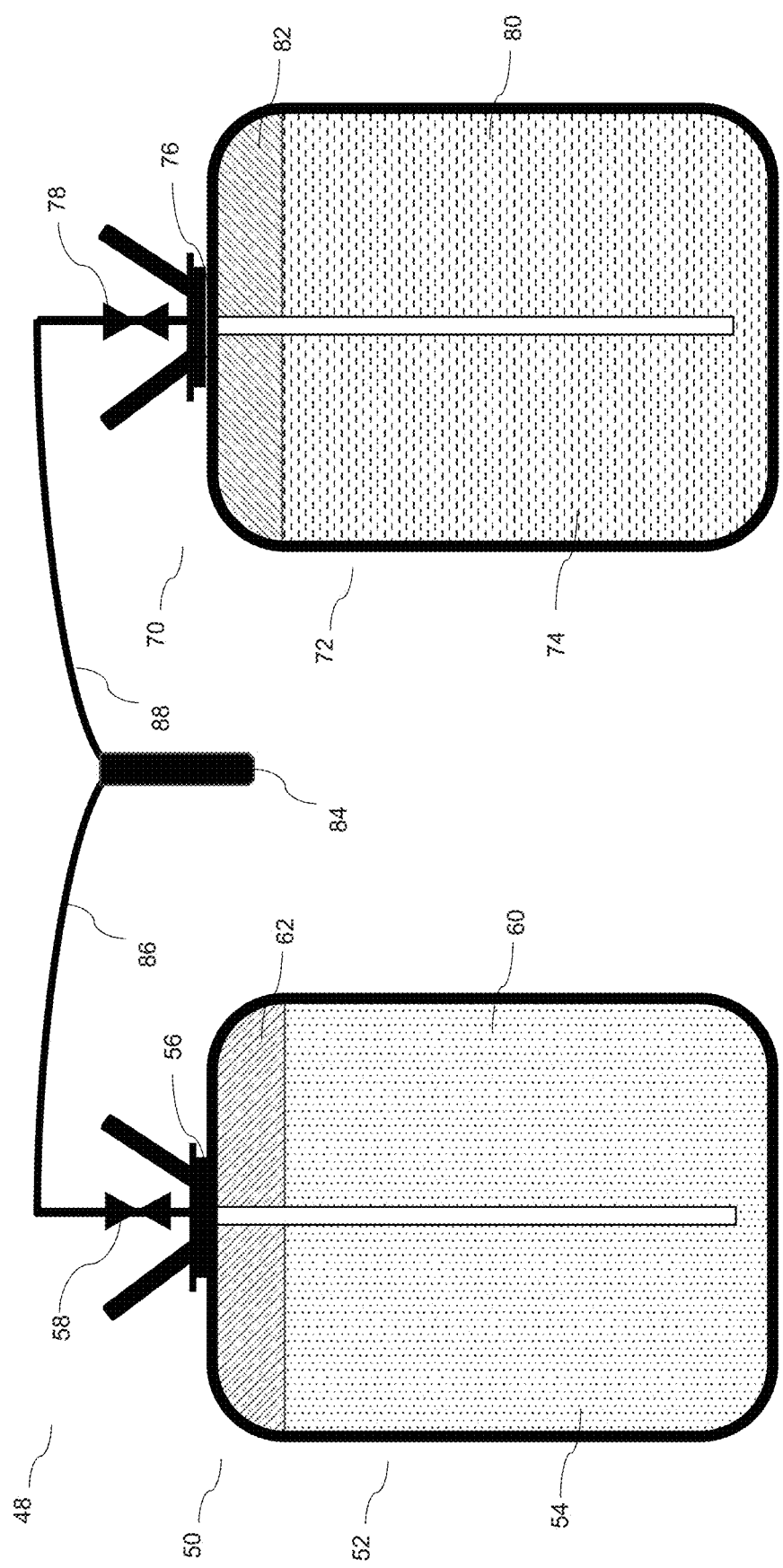
FIG. 2 shows a multi-component substance dispensing system, in accordance with certain embodiments.

A multi-component substance dispensing system 48 is shown in FIG. 2. As shown in FIG. 2, the multi-component substance dispensing system 48 includes a first dispensing device 50 and a second dispensing device 70. The first and second dispensing devices 50, 70 can be any container suitable for containing a pressure inside the container, for example the dispensing device 12, described with reference to FIG. 1. For example, the first dispensing device 50 can includes features corresponding to those described with the dispensing device 12, such as a first pressure vessel 52 that defines a first interior space 54 and has a first opening 56 and a first valve 58. As shown in FIG. 2, the first dispensing device 50 can contain a first substance 60 in the first interior space 54 and the first interior space 54 can define a first headspace 62. The second dispensing device 70 can includes features corresponding to those described with the dispensing device 12, such as a second pressure vessel 72 that defines a second interior space 74 and has a second opening 76 and a second valve 78. As shown in FIG. 2, the second dispensing device 70 can contain a second substance 80 in the second interior space 74, and the second interior space 74 can define a second headspace 82.

As shown in FIG. 2, the multi-component substance dispensing system 48 can include a spray apparatus 84, a first flow channel 86 and a second flow channel 88. As shown, the first flow channel 86 can have a first end connected to the first dispensing device 50 and a second end that can be connected to the spray apparatus 84. As shown, the second flow channel 88 can have a first end connected to the second dispensing device 70 and a second end that can be connected to the spray apparatus 84. The first and second flow channels 86, 88 can be any suitable apparatus for transporting a fluid known to one of skill in the art. For example, the first and second flow channels 86, 88 can be a hose, a pipe, a tube, or any apparatus through which a fluid can flow. As shown, the first and second flow channels 86, 88 can be connected to the first and second dispensing devices 50, 70 and provide fluid communication from each of the first and second dispensing devices 50, 70 to the spray apparatus 84.

Propellant Amounts in Multi-Component Substance Dispensing System

Each of the first and second dispensing devices 50, 70 can include the first propellant and the second propellant. For purposes of example, $CO_2$ and nitrogen will be used as the first propellant and second propellant, however, it is understood that any suitable chemical can be used as the first propellant and a second propellant. By way of example, the first and second dispensing devices 50, 70 will be referred to as a first and second canister.

In some embodiments, a suitable starting amount of first propellant and a second propellant in each of the first and second canister can provide a starting and ending pressure that is effective for dispensing substantially the entire amount of substance in each canister. For example, a suitable starting amount of first propellant and a second propellant in the canisters provides a dispensing system that delivers greater than 90%, greater than 90%, or even greater than 98% of the starting amount of substance in each canister.

In some embodiments, a suitable ratio of first propellant and a second propellant in each of the first and second canister can provide a starting and ending pressure that is suitable for effective dispensing of the substance. For example, a suitable ratio of first propellant and a second propellant in each of the first and second canister can allow substantially the entire amount of substance in each canister, e.g. greater than 90%, greater than 90%, or even greater than 98% of the starting amount of substance in each canister to be dispensed.

A suitable ratio of first propellant and a second propellant in each of the first and second canister can provide a starting pressure that provides a suitable volumetric flow rate, such as volumetric flow rate that is not too high even when the total pressure in the canisters is near a maximum allowable pressure for that kind of canister. A suitable ratio of first propellant and a second propellant in each of the first and second canister can provide an ending pressure that provides a suitable volumetric flow rate, such as volumetric flow rate that is not too low even when the total pressure in the canisters is low.

In some embodiments, a suitable ratio of first propellant and a second propellant in each of the first and second canister can provide a starting and ending pressure that is suitable for effective dispensing of the substance. For example, a suitable ratio of first propellant and a second propellant in each of the first and second canister can empty an entire 22 liter (L) canister no greater than from about 15 to 20 minutes, and in a Multi-Component Substance Dispensing System can deliver each substance at a suitable dispense ratio to the other substance.

In some embodiments, the total pressure change from the starting to the ending pressure in each canister can be controlled by the increase in the partial pressure of the first propellant, which is dissolved in the substance, because the dissolved propellant boils into the gas form as the pressure falls. In some embodiments, the total pressure change from the starting to the ending pressure in each canister after the substance has been dispensed can be about one fourth, about one half, or about three quarters of the total starting pressure. For example, the starting pressure in each canister can be from about 1379 kPa to 2758 kPa (200 to 400 psi) (one psi being about 6.89 kPa) and an ending pressure can be from about 345 kPa to 1034 kPa (50 to 150 psi), in a canister having an internal volume of about 22 L.

In some embodiments, a suitable weight ratio of the second propellant to the first propellant in the first canister is from greater than zero, from 5:100, or from 10:100, to 15:100, 25:100, or even 40:100, or a weight ratio between any pair of the foregoing values.

In some embodiments, a suitable weight ratio of the first propellant to the first substance in the first canister is from 2:100 to 4:100, or a weight ratio between the foregoing values.

In some embodiments, a suitable weight ratio of the second propellant to the first substance in the first canister is from greater than zero to 1:100, or a weight ratio between the foregoing values.

In some embodiments, a suitable weight ratio of the second propellant to the first propellant in the second canister is from greater than zero, from 4:100, or from 6:100, to 15:100, 20:100, or even 30:100, or a weight ratio between any pair of the foregoing values.

In some embodiments, a suitable weight ratio of the first propellant to the second substance in the second canister is from 4:100, or from 5:100, to 6:100, 7:100, or even 8:100, or a weight ratio between any pair of the foregoing values.

In some embodiments, a suitable weight ratio of the second propellant to the second substance in the second canister is from greater than zero to 1.5:100, or a weight ratio between the foregoing values.

In some embodiments, a suitable weight ratio of the first propellant in the first canister to the first propellant in the second canister is from 40:100 to 90:100.

In some embodiments, a suitable weight ratio of the second propellant in the first canister to the second propellant in the second canister is from 80:100 to 150:100.

In some embodiments, a suitable ratio of the pressure in the first canister to the pressure in the second canister is from 70:100 to 130:100.

Adhesive Composition

The systems and methods disclosed herein are suitable for dispensing an adhesive composition. For example, the systems and methods disclosed herein can be used to dispense any of a polyurea, an epoxy, or a polyurethane adhesive. The multi-component substance dispensing system 48 shown in FIG. 2 can be used to dispense a two-part polyurethane adhesive composition and with suitable dispensing characteristics.

In some embodiments, the systems and methods disclosed herein can be used to dispense a two-part polyurethane adhesive composition, with a first component of the polyurethane adhesive composition ("Part A") in a first substance dispensing system and a second component of the polyurethane adhesive composition ("Part B") in a second substance dispensing system. The substance dispensing system 10, described with reference to FIG. 1, is suitable for each of the first and second substance dispensing systems.

For example, each of the first and second substance dispensing systems can have a substance (Part A and Part B respectively) and contain a first propellant and a second propellant. The first and second substance dispensing systems can be controlled independent of one another such that a suitable dispense rate of each of the Part A and Part B can be controlled. The multi-component substance dispensing system can include a spray apparatus, such as 84 shown in FIG. 2. The spray apparatus 84 can be used to combine the Part A and Part B after being dispensed from the first and second substance dispensing systems to form a final composition. The dispense rate of each of the Part A and Part B can be balanced such that the volumetric flow rate of each side is complementary to the other to achieve a suitable final composition.

Using a polyurethane adhesive composition as an example, Part A can include an isocyanate compound, and Part B can include an isocyanate reactive compound, and a spray apparatus can mix the Part A and Part B to form a polyurethane composition. The spray apparatus can spray the polyurethane composition onto a substrate where it can react to form an adhesive composition.

Part A

In some embodiments, Part A includes an isocyanate compound. In some embodiments, the isocyanate compound has an average isocyanate functionality of two or greater. Preferred isocyanate compounds include those that are liquid at room temperature (from about 20° C. to about 23° C.) including those having a viscosity no greater than 500 cP, no greater than about 200 cP, or no greater than about 100 cP, at room temperature. In some embodiments, the isocyanate compound may be a monomer. In some embodiments, the isocyanate compound may be a prepolymer. For example, the isocyanate compound may be a polymer that is reacted with an isocyanate compound, such as an isocyanate terminated oligomer. In some embodiments, the isocyanate compound may be a polymeric isocyanate.

Suitable isocyanate compounds include, but are not limited to, aromatic isocyanates such as aromatic diisocyanates, or aliphatic isocyanates such as aliphatic diisocyanates. In some embodiments, the isocyanate compound has from one to 10 aliphatic or aromatic groups substituted by the isocyanate group.

Suitable isocyanate compounds include methylene diphenyl isocyanate compounds such as diphenyl methane diisocyanate including its isomers, methylene diphenyl diisocyanate (MDI), carbodiimide modified MDI, hydrogenated methylene diphenyl isocyanate (HMDI), hexamethylene diisocyanate (HDI), isophorone diisocyanate (IPDI), polymeric methylene diphenyl isocyanate, diphenylmethane-4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures and combinations thereof, although additional isocyanates are further contemplated. In some instances, aliphatic di, tri, and polyisocyanates are also suitable isocyanate compounds, including, for example, hydrogenated aromatic diisocyanates, aliphatic polyisocyanates, or cycloaliphatic polyisocyanates, although additional isocyanates are further contemplated. Suitable isocyanate compounds that are commercially available include the modified liquid MDI sold under the trade name ISONATE 143L (from The Dow Chemical Company, of Midland, MI), or the polymeric MDI sold under the trade name RUBINATE M (from Huntsman Corporation, of The Woodlands, TX).

In some embodiments, the isocyanate compound is present in the Part A in a weight percent from about 20 percent, about 30 percent, or about 40 percent, to about 70 percent, about 80 percent, about 90 percent, or about 100 percent, or a weight percent between any pair of the foregoing values, based on the total weight of the Part A. In embodiments having more than one isocyanate compound, the total amount of all isocyanate compounds present in the Part A have a combined weight percent from about 70 percent, about 80 percent, to about 90 percent, or about 100 percent, or a weight percent between any pair of the foregoing values, based on the total weight of the Part A.

Part B

In some embodiments, Part B includes an isocyanate reactive compound, catalyst, a surfactant, and a blowing agent.

The isocyanate reactive compound may be a compound containing an active hydrogen, for example an amine, an alcohol, or thiol. The isocyanate reactive compound can have a functionality of two or more. Preferred isocyanate reactive compounds are those having a functionality of two or more. Preferred isocyanate reactive compounds are those that have a low viscosity at room temperature.

The isocyanate reactive compound can include one or more polyols. In some embodiments, short chain diols may be suitable, for example, if a particular isocyanate index is desired. For example, a high enough isocyanate index, such as greater than 1.4, can be used in an adhesive to be applied on wet substrates.

The isocyanate reactive compound may be a polyol. The isocyanate reactive compound may be a combination of two or more polyols. For example, the isocyanate reactive compound may be a diol polyol, a triol polyol, tetra polyol or a higher order polyol, and combinations thereof. Preferred examples of polyols that may be used as the isocyanate reactive compound include those that have a low viscosity at room temperature. For example, a short chain diol can be included in the Part B. The short chain diol may form a chain extender and react with isocyanates group in Part A.

The polyol may be selected from the group consisting of a polyether polyol and a polyester polyol. Suitable polyether polyols include, but are not limited to, polyoxyalkylene polyols such as polyethylene glycol, polypropylene glycol, polytetramethylene glycol, polybutylene glycol, and mixtures and combinations thereof. In some embodiments, suitable polyether polyols include those having a number average molecular weight (Mn) from about 400, 500, 600, 1000 to about 1500, 2000, 3000, 4000, 5000 or 6000, or a molecular weight between any pair of the foregoing values.

In some embodiments, suitable polyols may include polyhydroxy ethers, including substituted or unsubstituted polyalkylene ether glycols or polyhydroxy polyalkylene ethers; polyhydroxy polyesters; the ethylene or propylene oxide adducts of polyols and the monosubstituted esters of glycerol; polymer polyols, for example graft polyols containing a proportion of a vinyl monomer, polymerized in situ; and mixtures and combinations thereof. Further examples of suitable polyols include poly(diethylene glycol adipate).

In some embodiments, a homopolymer and a copolymer of polyoxyalkylene may be used. In some embodiments, copolymers of the polyoxyalkylene polyols may include an adduct of at least one compound including ethylene glycol; propylene glycol; diethylene glycol; dipropylene glycol; triethylene glycol; 2-ethylhexanediol-1,3, glycerin; 1,2,6-hexane triol; trimethylol propane; trimethylol ethane; tris(hydroxyphenyl)propane; triethanolamine; triisopropanolamine; and one compound including ethylene oxide, propylene oxide and butylene oxide.

In some embodiments, a suitable polyester polyol can be formed from the reaction of one or more polyhydric alcohols having from about two to about 15 carbon atoms with one or more polycarboxylic acids having from about two to about 14 carbon atoms. Examples of suitable polyhydric alcohols include ethylene glycol, propylene glycol such as 1,2-propylene glycol, 1,3-propylene glycol, glycerol, pentacrythritol, trimethylolpropane, 1,4,6-octanetriol, butanediol, pentanediol, hexanediol, dodecanediol, octanediol, chloropentanediol, glycerol monallyl ether, glycerol mono ethyl ether, diethylene glycol, 2-ethylhexanediol, 1,4-cyclohexanediol, 1,2,6-hexanetriol, 1,3,5-hexanetriol, 1,3-bis-(2-hydroxyethoxy) propane and similar components.

In some embodiments, the isocyanate reactive compound is present in the Part B at a weight percent from about 20, about 30, or about 40 percent, to about 70, about 80, about 90, or about 100 percent, or a weight percent between any pair of the foregoing values, based on the total weight of the Part B. In preferred embodiments, the isocyanate reactive compound is present in the Part B in a weight percent from about 20, about 25, or about 30 percent, to about 35, about 40, about 45, or about 50 percent, or a weight percent between any pair of the foregoing values, based on the total weight of the Part B. In embodiments having more than one isocyanate reactive compound, the total amount of all isocyanate reactive compounds present in the Part B can have a combined weight percent from about 20, about 30, or about 40 percent, to about 70, about 80, about 90, or about 100 percent, or a weight percent between any pair of the foregoing values, based on the total weight of the Part B.

Suitable commercially available polyols include the triol polyether polyol sold under the trade name POLY-G 30-240 (from Monument Chemical Group, of Houston, TX), the triol polyether polyol sold under the trade name VORANOL 230-238 (from the Dow Chemical Company), and the polyether polyol sold under the trade name ARCOL LHT-240 (from Covestro AG, of Leverkusen, Germany).

The adhesive composition can include a catalyst. In some embodiments, the catalyst can be present in the Part B. Suitable catalysts include amine catalysts. Suitable catalysts include metal-based catalysts, for example, tin, bismuth, potassium, zirconium, and zinc-based catalysts. Suitable commercially available catalysts include those commercially available under the trade designations K-KAT 6212 or K-KAT XK-651 (from King Industries, Inc. of Nonwalk, CT), or DABCO T-120 (from Evonik of Essen Germany), or DURASTAB LT-4 or DURASTAB LT-2 (from Dura Chemical Corporation Ltd. of Oakland, CA). In some embodiments, the catalyst is present at a weight percent of from greater than 0, from one, two, three or four, to five, six, seven, eight, nine, or 10 percent, or a weight percent between any pair of the foregoing values. For example, in embodiments having the catalyst present in the Part B, the catalyst can be present at a weight percent of from greater than 0, from one, two, three or four, to five, six, seven, eight, nine, or 10 percent, or a weight percent between any pair of the foregoing values, based on the total weight of the Part B.

The adhesive composition can include one or more surfactants. In some embodiments, the surfactant can be present in the Part B. In some embodiments, the kind of surfactant can be chosen such that it helps stabilize a foam structure formed from the dispense substance or help with wet out of the dispensed substance. Suitable surfactants include anionic, ionic, and silicone surfactants. Suitable commercially available surfactants include those commercially available under the trade designations VORASURF DC198 (from Dow Chemical Company), KF-352A (from Shin-Etsu Chemical Co., Ltd. of Chiyoda City, Tokyo, Japan), and DISPONIL FES 61 (from BASF Chemicals, Co. of Ludwigshafen, Germany).

The amount of surfactant included can be suitable to control the cell structure of a foam form, for example, a polyurethane created with the reaction product of Part A and Part B and that has a foamed form. In some embodiments, the amount of surfactant is suitable to produce foamed adhesive that has a suitable final density and cell structure. For example, a suitable foamed adhesive can have a stable and suitably high adhesion strength over a wide temperature range. In some instances, the amount of surfactant in Part B can affect the solubility of the first propellant, for instance, in a Part B substance. In some embodiments, an amount of surfactant that is too low can result in foam that collapses after being formed, resulting a final cured foam that has a density from three to six times higher than desired. In some embodiments, an amount of surfactant that is too low will produce foam that does not rise to a suitable level, for example less than half of the height desired.

In some embodiments, the surfactant is present at a weight percent of from greater than zero, from about 0.1, about 0.5, or about one, two, or three percent, to four, five, or six percent, or a weight percent between any pair of the foregoing values. For example, in embodiments having the surfactant present in the Part B, the surfactant can be present at a weight percent of from greater than zero, from about 0.1, about 0.5, or about one, two, or three percent, to four, five, or six percent, or a weight percent between any pair of the foregoing values, based on the total weight of the Part B.

The adhesive composition can include one or more blowing agents. In some embodiments, the blowing agent may be a gas, for example, a gas propellant that is soluble in the substance. For instance, if the blowing agent is a gas propellant dissolved in one or more parts of the adhesive composition, when the adhesive composition is sprayed, the propellant can boil due to the reduced pressure and produce bubbles in the adhesive composition. For example, the blowing agent may be one or more of the propellants included with either the Part A or the Part B. The blowing agent can create voids, for example, pockets of gas, in the polyurethane adhesive composition once the components of the polyurethane adhesive composition are mixed. Suitable blowing agents that may be injected into the polyurethane adhesive composition include carbon dioxide.

In some embodiments, the blowing agent may be a liquid. In some embodiments, the blowing agent is water. For example, in the case of an adhesive composition being formed from polyurethane, water may be included to react with the polyurethane forming components to form carbon dioxide gas when the polyurethane components are mixed. The carbon dioxide gas forms bubbles in the liquid polyurethane adhesive composition. The bubbles form cavities in the polyurethane after it cures and hardens, resulting in a polyurethane adhesive composition having a foam form. Suitable blowing agents are those that can react with the components of Part A or the remaining components of the Part B to create pockets of gas that form cavities after the substance is dispensed, for instance, when the polyurethane adhesive composition is cured. Suitable chemical blowing agents include water, hydrazine, and for example, other nitrogen-based materials for thermoplastic and elastomeric foams, and sodium bicarbonate for thermoplastic foams.

In some embodiments, the blowing agent can be present in the Part B. In some embodiments, the blowing agent is present in the Part B at a weight percent from greater than zero, about 0.1 percent, about 0.5 percent, or about 1.0 percent, to about 1.5 percent, about 2.0 percent, about 2.5 percent, or about 3.0 percent, or a weight percent between any pair of the foregoing values, based on the total weight of the Part B.

The systems and methods disclosed herein provide a pump free system, suitable for dispensing a liquid substance. The systems and methods are free of heavy pumping equipment, environmentally damaging components, and flammable propellants.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

EXAMPLES

The following non-limiting examples are included to further illustrate various embodiments of the instant disclosure and do not limit the scope of the instant disclosure.
Test Methods
Solubility Test It can be helpful to know what amount of a component is dissolved in the substance. For example, if a first propellant is present with a first portion in the gas phase and a second portion in the liquid phase, it can be helpful to know the amount of that propellant that is in the liquid phase, for example, dissolved in the substance. The amount of liquid first propellant is the total amount of first propellant within a given space, such as the interior volume of the pressure vessel minus the amount of first propellant that is in the gas phase. The amount of first propellant (here subscript "P1") that is in the gas phase can be estimated using the Ideal Gas Law: PV=nRT, where P, V, and T are the pressure, volume and temperature respectively; n is the amount of propellant (P1); and R is the ideal gas constant. Rearranging the equation gives equation 1 for a single gas system.

$$n(P1, \text{headspace}) = \frac{P_{P1, headspace} * V_{headspace}}{R * T} \quad \text{Equation 1}$$

The volume of the first propellant that is in the gas phase is approximately the volume of the headspace, and the volume of the headspace can be approximated if it is assumed the substance is incompressible and that the volume of the liquid first propellant is negligible compared to the volume of the substance. The volume of the headspace is approximately the difference between the interior space of the pressure vessel and the volume of the substance positioned in the pressure vessel. R is a known constant; and the pressure and temperature of the pressure vessel can be measured. The amount of first propellant in the liquid phase is then the amount of propellant in the gas phase (calculated with equation 1) subtracted from the total amount of propellant that has been placed in the pressure vessel.

A propellant is determined to be soluble in a liquid substance when a pressure vessel is approximately three quarters filled with substance and the headspace of the pressure vessel is filled with the propellant to be tested, and if after 48 hours at least half of the propellant by weight in the pressure vessel is dissolved in the liquid substance.
Test System Preparation for Substance Dispensing Test Method A test system for use in the Substance Dispensing Test Method is prepared as follows. A pressure vessel is a tank having an internal volume of 22 liters, having a working pressure/maximum pressure rating of 260/325 psi or 320/400 psi. A substance is put in the pressure vessel. The amount of substance put in the pressure vessel is determined by taring the pressure vessel using the weight of the pressure vessel before and after the substance has been added. The total weight of the substance to be added can also be recorded before it is added.

A first propellant is put in the pressure vessel. The first propellant can be liquified when pressurized at a temperature of about 20° C. and is soluble in the substance (i.e. 50% or greater of the total amount of first propellant in the pressure vessel is dissolvable in the substance at the pressure of the initial fill level (the initial pressure)) inside the pressure vessel), such that at least a portion of the first propellant is dissolved in the substance in the pressure vessel at the initial pressure. The first propellant is soluble enough in the substance to reduce the viscosity of the substance as compared to a propellant that has limited solubility in the substrate.

The pressure vessel is then manipulated (e.g. vibrating, shaking, oscillating, rocking) to dissolve a first portion of the first propellant in the substance. The pressure within the pressure vessel can be measured to determine the amount of first propellant that is dissolved in the substance. An additional amount of first propellant can be added if suitable. The substance having the dissolved first propellant is a test composition.

After a suitable amount of first propellant has been added to the pressure vessel to form the test composition, a second propellant is put into the pressure vessel. The second propellant is one that cannot be liquified when pressurized at a temperature above 20° C. The second propellant is a propellant that is substantially insoluble in the substance at the pressure at the pressure of the initial fill level (the initial pressure). A suitable amount of second propellant can be put into the pressure vessel until the interior space of the pressure is at a desired pressure.

Once all the substance, first propellant, and second propellant that will be put into the pressure vessel for a test are added, the pressure vessel is then at its initial fill level. The pressure in the pressure vessel after putting the substance, the first propellant, and the second propellant in the pressure vessel is the initial pressure.

Substance Dispensing Test Method

The valve on the canister is opened to allow flow of the substance from the canister. The amount of substance that is dispensed can be determined by collecting the substance as it is being dispensed. Alternatively, or additionally, the amount of weight that the canister decreases by in a measured amount of time as the substance is dispensed from the canister can measured. Volumetric flow rate (e.g. mL/sec) is calculated by dividing the amount of substance dispensed in a measured amount of time and converting the weight of the dispensed substance to its volume using the density of the substance.

"Initial dispense rate" is the volumetric flow rate the substance is dispensed from a pressure vessel, as measured when starting from the initial fill level in the pressure vessel to within 90% of the initial fill level (i.e. the volumetric flow rate as measured before 10% of the starting amount of substance has been dispensed from the pressure vessel).

"Final dispense rate" is the volumetric flow rate the substance is dispensed from a pressure vessel, as measured when less than 10% of the initial fill level remains in the pressure vessel till the pressure vessel is empty (i.e. the volumetric flow rate as measured after 90% of the starting amount of substance has been dispensed from the pressure vessel).

"Total dispense time" is the total time to dispense a substance starting from the initial fill level to when 95% or more of the starting amount has been dispensed. The end of the test can also be determined as the time when substance is no longer dispensing from the vessel. The end of the test can be confirmed by weighing the vessel to determine a final weight indicating that the vessel is empty.

Test System Preparation for Multi-Component Substance Dispensing Test Method

A test system for use in a Multi-Component Substance Dispensing Test Method includes a plurality of pressure vessels. Each of the plurality of pressure vessels are prepared with the Test System Preparation for Substance Dispensing Test Method above, including the following steps. A first pressure vessel (A) is filled with a first substance ("Substance A"). A second pressure vessel (B) is filled with a second substance ("Substance B"). A first and second propellant are put into the first and second pressure vessels with the steps described above for the Test System Preparation for Substance Dispensing Test Method.

Multi-Component Substance Dispensing Test Method

First, each canister of the Multi-Component Substance Dispensing System is filled to an initial composition and pressure. The volumetric flow rate of each canister of the Multi-Component Substance Dispensing System is measured using the Substance Dispensing Test Method described above. The volumetric flow rate of each substance from each canister at the initial composition and pressure is measured.

Second, each canister of the Multi-Component Substance Dispensing System is filled to the initial composition and pressure used in step one. A pipe is attached to each of the canisters. The other end of each pipe that is attached to each canister is attached to an applicator. The valve on each canister is opened to allow flow through the respective hoses to the applicator where the substance from each of the canisters are combined with the substance from the other canister. The features of the mixture of the substances dispensed from the canisters of the Multi-Component Substance Dispensing System is observed and recorded.

Multi-Component Substance Dispensing Test Results

A two-component substance dispensing system was prepared using the Test System Preparation for Multi-Component Substance Dispensing Test Method. The test system used a first pressure vessel (A) and a second pressure vessel (B). The pressure vessels used were 22 L vessels with a working pressure/maximum pressure rating of 260/325 psi or 320/400 psi (available from Worthington Industries, of Columbus, OH.) About 16.8 kg (37 pounds (lbs)) of substance A was put in the first pressure vessel, and about 13.6 kg (30 lbs) of substance B was put in the second pressure vessel.

Substance A was 100% by weight polymeric methylene diphenyl diisocyanate (MDI), with 2.7 functionality.

In an embodiment, Substance A includes MDI that is sourced from non-petroleum-based sources. An example of MDI sourced from non-petroleum-based sources includes MDI sourced from alternative raw materials, such as based on plant waste. Examples of MDI sourced from non-petroleum-based sources includes bio-based difurfuryl diisocyanate, bio-based dimeryl diisocyanate, or other renewable diisocyanate. The diisocyanate can be sustainable through a biomass balance method. Examples of commercially available MDI sourced from alternative raw materials include those available from Covestro (located in Krefeld-Uerdingen, Germany). In an embodiment, Substance A includes at least 90% by weight MDI sourced from alternative raw materials, based on the total weight of Substance A.

The composition of Substance B for Samples 1-6, 8, 9, 11, 12 shown in Table 3 is given in Table 1. The percent by weight of each component is given based on the total weight of the substance Part B.

The compositions of Substance B in Tables 1 and 2 included a tin catalyst. In an alternative embodiment, Substance B includes an amine catalyst.

In an embodiment, Substance B includes at least one polyol based on recycled polyol. Recycled polyol can be derived from recycled polycarbonate, recycled polyethylene terephthalate (PET), or any other recycled material.

In an embodiment, Substance B includes at least one polyol based on non-petroleum-based sources. Examples of polyols based on non-petroleum-based sources include polyol derived from renewable resources. Examples of polyol based on non-petroleum-based sources include polyol derived from at least one of soybean, millet, nuts, corn, potatoes, citrus fruit, woody plants, cellulosic waste, forestry products (e.g., pine and spruce trees, tall oil, castor oil), sugar (sugar beets, sugar cane), sucrose, and wheat. Examples of commercially available bio-based polyols include polyols available under the trade designations BIO-HOOPOL (such as BIO-HOOPOL 11034 and BIO-HOOPOL 11003, available from Synthesia Technology of Barcelona, Spain), DYNACOLL (such as TERRA EP 481.01, available from Evonik Gmbh, Germany) and VEL-VETOL (VELVETOL H-1000 and VELVETOL H-2000, available from Allessa GmbH, of Frankfort, Germany).

TABLE 1

Composition of Substance B for Samples 1-6, 8, 9, 11, 12

| Component | Percent by Weight in Substance B |
|---|---|
| 2000 Mn polyether diol | 89 |
| Diethylene glycol | 3 |
| Dipropylene glycol | 3 |
| Catalyst | 2 |
| Silicone surfactant | 1 |
| Water | 2 |

The composition of Substance B for Samples 7, 10, 13, 15 shown in Table 3 is given in Table 2. The percent by weight of each component is given based on the total weight of the substance Part B.

TABLE 2

Composition of Substance B for Samples 7, 10, 13, 15

| Component | Percent by Weight in Substance B |
|---|---|
| 2000 Mn polyether diol | 90 |
| Diethylene glycol | 3 |
| Dipropylene glycol | 3 |
| Catalyst | 2 |
| Silicone surfactant | 0 |
| Water | 2 |

Filling Process

Once substance A and substance B were placed in the respective pressure vessels, a first amount of first propellant was put into each of the first pressure vessel (A) and the second pressure vessel (B). Once the first amount of first propellant was put in the pressure vessel, the pressure vessel was placed on a benchtop shaker (model number E5903.00, available from Eberbach Corp. of Belleville, MI), and shaken for fifteen minutes at the highest frequency of the benchtop shaker that would allow the pressure vessel to remain on the benchtop shaker.

The shaking step allows contact between the substance and the first propellant in the pressure vessel and helps the first propellant dissolve in the substance. The shaking step helps decrease the amount of time needed for propellant to dissolve into the substance than would take if the pressure canister were left at rest, and decreases the amount of time until the propellant reaches the amount dissolved at equilibrium. After each pressure vessel was shaken for at least 15 minutes, the remaining amount of first propellant was placed in the respective pressure vessel to bring the total amount of first propellant in each pressure vessel to the initial fill weight, shown in Table 3 for each Sample.

The first propellant was $CO_2$. The amount of first propellant in each of the first pressure vessel (A) and the second pressure vessel (B) is given by weight in pounds in Table 3. The column labeled "First Propellant A/B (lbs)" includes the amount, in lbs, of $CO_2$ put into each of the pressure vessels A and B respectively. The first propellant ($CO_2$) is soluble in each of Part A and Part B.

After the first propellant was put in each pressure vessel, the second propellant was put into the first pressure vessel (A) and the second pressure vessel (B). In Samples 1 to 11, the second propellant was nitrogen. In Samples 12 and 13, the second propellant was argon. In Sample 14, the second propellant was helium. The amount of second propellant at the initial fill weight in each of the first pressure vessel (A) and the second pressure vessel (B) is given in Table 2. The column labeled "Second Propellant A/B (lbs)" includes the amount, in pounds, of second propellant put into each of the pressure vessels A and B respectively.

The pressure inside each of the first pressure vessel (A) and the second pressure vessel (B) respectively is given in psi in the column labeled "Initial Pressure A/B (psi)." This shows the initial pressure in each pressure vessel (A and B) when each pressure vessel was full, at the start of the test.

The "A/B Dispensed Ratio" shows the amount of first substance dispensed from the first pressure vessel (A) in excess of the amount of second substance dispensed from the second pressure vessel (B), given as a percent by weight of the amount of second substance dispensed.

The "Initial Dispense Rate" is the volumetric flow rate of the combination of both substances dispensed from both pressure vessels, as measured when starting from the initial fill level in each pressure vessel to within 90% of the initial fill level (i.e. the volumetric flow rate as measured before 10% of the starting amount of substance has been dispensed from the pressure vessel).

The "Final Dispense Rate" is the volumetric flow rate of the combination of both substances dispensed from both pressure vessels, as measured when less than 10% of the initial fill level remains in each pressure vessel till each pressure vessel is empty (i.e. the volumetric flow rate as measured after 90% of the starting amount of substance has been dispensed from the pressure vessel).

The "Total Dispense Time" is the total time to dispense whichever of first or second substance empties first, starting from the initial fill level to when 95% or more of the starting amount has been dispensed.

The Samples and two Comparative examples were tested according to the test methods above. The results are in Table 3.

Comparative Example 1 (C1) was commercially available under the trade designation OLYBOND500 (from OMG Roofing Products, of Agawam, Mass.) The provider of Comparative Example 1 advertises it as being a two-component, low-rise polyurethane foam adhesive. Comparative Example 1 included HFC 134a and nitrogen as the propellants. Comparative Example 2 (C2) was commercially available under the trade designation FLEXIBLE FAST Dual Tank Adhesive (from Carlisle Synthetic Systems, of Carlisle, PA.) The provider of Comparative Example 2 advertises it as being a two-component, construction-grade, low-rise polyurethane adhesive. Comparative Example 2 included HFC 134a and nitrogen as the propellants.

TABLE 3

| Sample | First Propellant A/B (lbs) | Second Propellant A/B (lbs) | Initial Pressure A/B (psi) | A/B Dispensed Ratio | Initial Dispense Rate (mL/sec) | Final Dispense Rate (mL/sec) | Total dispense time (minutes) |
|---|---|---|---|---|---|---|---|
| 1 | about 0.85 lb each | 0 | 260/260 | 50% A rich | 6-12 | 1.5-2 | 38 |

TABLE 3-continued

| Sample | First Propellant A/B (lbs) | Second Propellant A/B (lbs) | Initial Pressure A/B (psi) | A/B Dispensed Ratio | Initial Dispense Rate (mL/sec) | Final Dispense Rate (mL/sec) | Total dispense time (minutes) |
|---|---|---|---|---|---|---|---|
| 2 | about 0.90 lb each | 0 | 300/300 | 30% A rich | 14-15 | 3.5-5.5 | 28-29 |
| 3 | 1.0/1.0 | 0.21/0.18 | 300/300 | 17% A rich | 8-10 | 5-6 | — |
| 4 | 2.75/3.62 | 0.08/0.10 | 300/320 | 8.5% A rich | 12.5-13.5 | 3-4 | 42 |
| 5 | 1.47/1.24 | about 0.20/0.18 | 320/320 | 20% A rich | 10.5-13 | 5-6 | 27.5 |
| 6 | 1.27/1.67 | 0.11/0.12 | 260/260 | 23% A rich | 24-28 | 7.5-8 | 16.5 |
| 7 | 1.24/1.65 | 0.21/0.20 | 320/320 | 16% A rich | 20-25 | 10.5-12 | 14 |
| 8 | 1.26/1.67 | 0.16/0.20 | 300/320 | 8% A rich | 19-25 | 7-9 | 17 |
| 9 | 0.95/1.69 | 0.22/0.17 | 320/320 | 10.5% A rich | 21-24 | 8-9.5 | 14.5 |
| 10 | 0.96/1.68 | 0.21/0.16 | 300/300 | 1.5% A rich | 19-24 | 7-8 | 19.5 |
| 11 | 0.94/1.70 | 0.12/0.12 | 260/260 | 1% A rich | 20-22 | 7-8 | 20 |
| 12 | 0.97/1.68 | 0.23/0.19 | 260/260 | 13% A rich | 21-22 | 6.5-7.5 | 19.5 |
| 13 | 0.93/1.65 | 0.29/0.22 | 260/260 | 15% A rich | 20-24 | 7.5-8 | 17 |
| 14 | 0.97/1.69 | Too light to measure | 260/260 | 14% A rich | 19-22 | 7-8.5 | 17.5 |
| C1 | Unknown | Unknown | 200/210 | 2-6% B rich | 16-18 | 5-6 | 25 |
| C2 | Unknown | Unknown | 150/210 | 5-20% B rich | 20-30 | 5-6 | 20 |

As shown in Table 3, a suitable ratio of first propellant to second propellant provides a suitable initial dispense rate and helps maintain adequate pressure in the pressure vessel as the substance is dispensed. As a result, the substance can be dispensed at a higher final dispense rate than when there is not enough of at least one propellant in the gas phase at that stage. As shown in the columns labeled First Propellant A/B and Second Propellant A/B, the ratios of first propellant to second propellant in the samples that included the features of the instant disclosure can be adjusted to meet the performance of commercially available materials, such as shown by C1 or C2, yet without using environmentally damaging components or flammable propellants.

Samples 7 to 14 exhibited an initial dispense rate greater than 19 mL/sec, and a final dispense rate greater than seven mL/sec. The total dispense rate for each of these samples was no greater than 20 minutes, using a 22 L pressure vessel, and the dispensed ratio was no greater than 20% rich for either part A or part B. As shown in Sample 11 and 12, the ratio of substance A delivered to substance B was very close; Samples 11 and 12 each delivered the adhesive mixture having substance A at no greater than two % in excess of substance B, in percent by weight, and also have a total dispense rate for each of these samples of no greater than 20 minutes, for a 22 L pressure vessel.

Samples having a suitable adhesive composition and ratio of first propellant to second propellant created an adhesive that was suitably foamed and had a suitable density. For example, an adhesive in foamed form having a density from about 0.04 g/mL to about 0.15 g/mL is typically suitable for a wide variety of applications. This can also be compared to a density of an adhesive in a foamed form that is usually dispensed from an apparatus that includes a mechanical pump (for instance, an adhesive such as a pump grade adhesive available under the trade designation MILLENNIUM PG-1, from H.B. Fuller Company, of St. Paul, MN.)

The adhesive was suitably dispensed such that it can be applied to hold substrates together with good adhesive strength. Sample 11 was tested using test method ANSI FM 4474-2004 (R2010) "Standard for Evaluating the Simulated Wind Uplift Resistance of Roof Assemblies" using a 3.7 by 7.3-meter test sample and determined to achieve at least a 1-90 rating.

What is claimed is:

1. A substance dispensing system comprising:
    a first pressure vessel defining a first interior space;
    a first substance positioned in the first interior space, the first substance being in a liquid phase;
    a first portion of a first propellant positioned in the first interior space; and
    a first portion of a second propellant positioned in the first interior space;
    wherein the first propellant is at least one from the group consisting essentially of carbon dioxide, nitrous oxide, and combinations thereof,
    wherein the second propellant is at least one from the group consisting essentially of nitrogen, argon, oxygen, helium, and combinations thereof, and
    wherein a weight ratio of the second propellant to the first propellant in the first interior space is from 1:100 to 50:100.

2. The substance dispensing system of claim 1, wherein the first propellant and the second propellant are free of hydrocarbons, hydrofluorocarbons, and chlorofluorocarbons.

3. The substance dispensing system of claim 1, wherein a weight ratio of the second propellant to the first propellant in the first interior space is from 1:100 to 40:100.

4. The substance dispensing system of claim 1, wherein a weight ratio of the second propellant to the first propellant in the first interior space is from 1:100 to 30:100.

5. The substance dispensing system of claim 1 and further comprising:
    a second pressure vessel defining a second interior space;
    a second substance positioned in the second interior space, the second substance being in a liquid phase;
    a second portion of a first propellant positioned in the second interior space; and
    a second portion of a second propellant positioned in the second interior space;
    wherein the first propellant is at least one from the group consisting essentially of carbon dioxide, nitrous oxide, and combinations thereof,
    wherein the second propellant is at least one from the group consisting essentially of nitrogen, argon, oxygen, helium, and combinations thereof, and wherein a weight ratio of the second propellant to the first propellant in the second interior space is from 1:100 to 40:100.

6. The substance dispensing system of claim 5, wherein a weight ratio of the second propellant to the first propellant in the second interior space is from 1:100 to 30:100.

7. The substance dispensing system of claim 5, wherein a weight ratio of the second propellant to the first propellant in the second interior space is from 1:100 to 20:100.

8. The substance dispensing system of claim 5, wherein a weight ratio of the first portion of the first propellant positioned in the first interior space to the second portion of the first propellant positioned in the second interior space is from 40:100 to 90:100.

9. The substance dispensing system of claim 5, wherein a weight ratio of the first portion of the second propellant positioned in the first interior space to the second portion of a second propellant positioned in the second interior space is from 80:100 to 150:100.

10. The substance dispensing system of claim 5, wherein a ratio of a pressure in the first interior space to a pressure in the second interior space is from 70:100 to 130:100.

11. The substance dispensing system of claim 5, wherein the first substance includes an isocyanate compound, and wherein the second substance includes an isocyanate reactive compound, a metal catalyst, a surfactant, a chain extender, and a blowing agent.

12. The substance dispensing system of claim 5, wherein the first propellant positioned in the first interior space is the same propellant as the first propellant positioned in the second interior space, and the second propellant positioned in the first interior space is the same propellant as the second propellant positioned in the second interior space.

13. A substance dispensing system comprising:
a first pressure vessel defining a first interior space;
a first substance positioned in the first interior space, the first substance being in a liquid phase;
a first portion of a first propellant positioned in the first interior space;
a first portion of a second propellant positioned in the first interior space, and substantially in a gas phase of the first interior space;
a second pressure vessel defining a second interior space;
a second substance positioned in the second interior space, the second substance being in a liquid phase;
a second portion of the first propellant positioned in the second interior space; and
a second portion of the second propellant in the second interior space and substantially in a gas phase of the second interior space;
wherein a weight ratio of the second propellant to the first propellant in the first interior space is from greater than zero to 50:100,
wherein a weight ratio of the second propellant to the first propellant in the second interior space is from greater than zero to 40:100, and
wherein the first propellant and the second propellant are free of hydrocarbons, hydrofluorocarbons, and chlorofluorocarbons.

14. The substance dispensing system of claim 13, wherein the first propellant is at least one from the group consisting essentially of carbon dioxide, nitrous oxide, and combinations thereof; and wherein the second propellant is at least one from the group consisting essentially of nitrogen, argon, oxygen, helium, and combinations thereof.

15. The substance dispensing system of claim 13, wherein a weight ratio of the second propellant to the first propellant in the first interior space is from 1:100 to 40:100.

16. The substance dispensing system of claim 13, wherein a weight ratio of the second propellant to the first propellant in the first interior space is from 1:100 to 30:100.

17. The substance dispensing system of claim 13, wherein a weight ratio of the second propellant to the first propellant in the second interior space is from 1:100 to 30:100.

18. The substance dispensing system of claim 13, wherein a weight ratio of the second propellant to the first propellant in the second interior space is from 1:100 to 20:100.

19. The substance dispensing system of claim 13, wherein a weight ratio of second propellant in the first interior space to the second propellant in the second interior space is from 80:100 to 150:100.

20. The substance dispensing system of claim 13, wherein the first substance includes an isocyanate compound, and wherein the second substance includes an isocyanate reactive compound, a metal catalyst, a surfactant, a chain extender, and a blowing agent.

* * * * *